United States Patent
Hain

(10) Patent No.: US 11,139,977 B2
(45) Date of Patent: *Oct. 5, 2021

(54) SYSTEM AND METHOD FOR PROOF OF VIEW VIA BLOCKCHAIN

(71) Applicant: VERASITY LIMITED, Road Town (VG)

(72) Inventor: Robert James Mark Hain, Sanremo (IT)

(73) Assignee: Verasity Limited, Road Town (VG)

( * ) Notice: Subject to any disclaimer, the term of this patent is extended or adjusted under 35 U.S.C. 154(b) by 0 days.

This patent is subject to a terminal disclaimer.

(21) Appl. No.: 17/192,045

(22) Filed: Mar. 4, 2021

(65) Prior Publication Data

US 2021/0194693 A1 Jun. 24, 2021

Related U.S. Application Data

(63) Continuation-in-part of application No. 16/023,354, filed on Jun. 29, 2018, now Pat. No. 10,956,931.

(Continued)

(51) Int. Cl.

| | |
|---|---|
| *G06Q 30/00* | (2012.01) |
| *H04L 9/32* | (2006.01) |
| *G06F 16/958* | (2019.01) |
| *G06Q 20/40* | (2012.01) |
| *H04L 9/06* | (2006.01) |

(Continued)

(52) U.S. Cl.
CPC .......... *H04L 9/3218* (2013.01); *G06F 16/958* (2019.01); *G06Q 20/401* (2013.01); *G06Q 30/0248* (2013.01); *H04L 9/0643* (2013.01); *H04L 65/4069* (2013.01); *H04L 65/608* (2013.01); *H04L 2209/38* (2013.01)

(58) Field of Classification Search
CPC ........... G06Q 30/0225; G06Q 30/0248; G06Q 20/401; H04L 9/3218; H04L 9/0643; H04L 65/4069; H04L 65/608; H04L 2209/38

See application file for complete search history.

(56) References Cited

U.S. PATENT DOCUMENTS

| | | | |
|---|---|---|---|
| 8,417,966 B1 * | 4/2013 | Mooneyham | H04L 9/3236 713/189 |
| 9,485,265 B1 * | 11/2016 | Saperstein | G06Q 20/4016 |

(Continued)

OTHER PUBLICATIONS

Nikolakis, William, et al. "How Blockchain can Shape Sustainable Global Chains: An Evidence, Verifiability, and Enforceability Framework." Sustainability: Oct. 29, 2018. (Year: 2018).*

*Primary Examiner* — Luis A Brown
(74) *Attorney, Agent, or Firm* — Ellenoff Grossman & Schole LLP; James M. Smedley; Alex Korona

(57) ABSTRACT

A Proof of View verification system is disclosed. The Proof of View verification system has a Proof of View verification module, comprising computer-executable code stored in non-volatile memory, and a processor. The Proof of View verification module and the processor are configured to receive a request for a content view to view a piece of content, record a content view data in a database chunk, hash the database chunk into a hashed database chunk, append the hashed database chunk to a block on a blockchain of the Proof of View verification system, and compare the content view data with the block on the blockchain. The blockchain is publicly available.

20 Claims, 5 Drawing Sheets

Related U.S. Application Data

(60) Provisional application No. 62/627,285, filed on Feb. 7, 2018, provisional application No. 62/660,167, filed on Apr. 19, 2018.

(51) Int. Cl.
*H04L 29/06* (2006.01)
*G06Q 30/02* (2012.01)

(56) References Cited

U.S. PATENT DOCUMENTS

| | | | | |
|---|---|---|---|---|
| 9,875,510 | B1* | 1/2018 | Kasper | H04L 67/104 |
| 10,305,833 | B1* | 5/2019 | Dennis | H04L 51/12 |
| 2007/0250901 | A1* | 10/2007 | McIntire | H04N 21/8586 |
| | | | | 725/146 |
| 2008/0270164 | A1* | 10/2008 | Kidder | G06Q 30/0241 |
| | | | | 705/14.4 |
| 2012/0011567 | A1* | 1/2012 | Cronk | H04N 21/4753 |
| | | | | 726/4 |
| 2014/0033317 | A1* | 1/2014 | Barber | G06Q 30/0609 |
| | | | | 726/26 |
| 2016/0219332 | A1* | 7/2016 | Asbun | H04N 21/4532 |
| 2016/0283920 | A1* | 9/2016 | Fisher | H04L 9/3297 |
| 2017/0053307 | A1* | 2/2017 | Schler | G06Q 30/0185 |
| 2017/0103468 | A1* | 4/2017 | Orsini | G06Q 40/12 |
| 2017/0134161 | A1* | 5/2017 | Goeringer | G06Q 20/065 |
| 2017/0318356 | A1* | 11/2017 | Hain | H04N 21/25866 |
| 2018/0069947 | A1* | 3/2018 | Antipa | H04L 67/327 |
| 2018/0167200 | A1* | 6/2018 | High | A61B 5/1171 |
| 2018/0167394 | A1* | 6/2018 | High | H04L 63/123 |
| 2018/0183606 | A1* | 6/2018 | High | H04L 9/3239 |
| 2018/0374097 | A1* | 12/2018 | Hanna | H04L 67/306 |
| 2019/0034975 | A1* | 1/2019 | Rizk | G06Q 30/0218 |
| 2019/0108545 | A1* | 4/2019 | Green | G06Q 30/0248 |
| 2019/0205932 | A1* | 7/2019 | Ericson | G06Q 30/0255 |
| 2019/0207770 | A1* | 7/2019 | Zhou | H04L 9/0637 |
| 2019/0236214 | A1* | 8/2019 | Kokernak | H04N 21/478 |
| 2019/0244241 | A1* | 8/2019 | Hain | G06Q 30/0248 |
| 2019/0261063 | A1* | 8/2019 | Woodman | H04N 21/44008 |
| 2020/0145219 | A1* | 5/2020 | Sebastian | H04L 9/3231 |
| 2021/0194693 | A1* | 6/2021 | Hain | G06Q 20/401 |

* cited by examiner

SYSTEM AND METHOD FOR PROOF OF VIEW VIA BLOCKCHAIN

RELATED APPLICATIONS

This application claims the benefit of U.S. Nonprovisional patent application Ser. No. 16/023,354 filed Jun. 29, 2018, U.S. Provisional Patent Application Ser. No. 62/627,285 filed Feb. 7, 2018, and U.S. Provisional Patent Application Ser. No. 62/660,167 filed Apr. 19, 2018, which are hereby incorporated by reference in their entirety.

TECHNICAL FIELD

The present disclosure is directed to an automated system and method for providing (e.g., ensuring) integrity of views of online content. Embodiments of the present invention generate and ensure proof of views (PoV) of content by leveraging blockchain to verify the veracity of content views. Generating proof of views of content may be utilized to determine the integrity of a content provider channel value, and thereby the integrity of a content market exchange, or channel stake marketplace (CSM).

BACKGROUND

Currently, views on large platforms are suspect and often faked. Views are predominantly utilized to value and measure traffic on content provider sites, and subsequently their sponsor and ad revenues are derived from the number of views. If the views are faked, altered, or manipulated, the economics for content providers is skewed. In particular, the Google and Facebook models are dependent on view count and content providers are entirely compensated on number of views even though a large part of the views counted may have not existed.

Currently there is no effective technique for transparently verifying views. Integrity and transparency of views determines the value of a content provider's channel. Without a system for verifying the integrity of views, advertisers and content providers have the difficult task of determining the actual value of a channel.

Therefore, there is a need in the art for a system and method for determining the integrity of a content provider channel value and therefore the integrity of the Content Market Exchange. The exemplary disclosed system and method of the present disclosure is directed to overcoming one or more of the shortcomings set forth above and/or other deficiencies in existing technology.

SUMMARY OF THE DISCLOSURE

In one exemplary aspect, the present disclosure is directed to a Proof of View verification system. The Proof of View verification system includes a Proof of View verification module, comprising computer-executable code stored in non-volatile memory, and a processor. The Proof of View verification module and the processor are configured to receive a request for a content view to view a piece of content, record a content view data in a database chunk, hash the database chunk into a hashed database chunk, append the hashed database chunk to a block on a blockchain of the Proof of View verification system, and compare the content view data with the block on the blockchain. The blockchain is publicly available.

In another aspect, the present disclosure is directed to a method. The method includes receiving a request to sell a stake of a channel of the channel stake marketplace, determining a value of the channel, generating a stake offering based on the value of the channel, and updating the value of the channel. Determining the value of the channel includes determining the amount of verified content views of the channel. Determining the amount of verified content views of the channel includes recording a content view data in a database chunk, hashing the database chunk into a hashed database chunk, appending the hashed database chunk to a block on a blockchain, and comparing the content view data with the block on the blockchain.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still within the spirit of the disclosure as described herein.

DETAILED DESCRIPTION

According to an embodiment of the present invention, exemplary systems and methods described herein work to ensure the integrity and transparency of views of online content for the purpose of determining the value of a content provider's channel. The Proof of View (PoV) methodology is used to provide a transparent system for determining the integrity of such views.

According to an embodiment of the present invention, Proof of View is utilized within the system to determine the integrity of a content provider channel value and therefore the integrity of an offered Content Market Exchange. In at least some exemplary embodiments, to ensure an accurate and transparent Proof of View, the system implements publicly auditable logs. These logs may contain, for instance, data associated with views of the content, content recommendations, anonymized information on the user who viewed the content, other relevant data points, or any combination thereof. One of ordinary skill in the art would appreciate that there are numerous data points that could be used with embodiments of the present invention, and embodiments of the present invention are contemplated for use with any appropriate data points.

In one embodiment of the present invention, a Merkle hash tree will be used to minimize the volume of data to be stored, while still maintaining a guarantee that the database has never been altered. In the hash tree, each view is hashed before being combined with other hashes until a final top hash is reached. Each Top Hash may represent all of the data stored in the specific log of data. One of ordinary skill in the art would appreciate that there are numerous methods for hashing chunks of data, and embodiments of the present invention are contemplated for use with any appropriate method for hashing and storing chunks of data.

One of ordinary skill in the art would appreciate that there are numerous hashing algorithms that could be used with embodiments of the present invention, and embodiments of the present invention are contemplated for use with any appropriate hashing algorithm.

Figure 3:
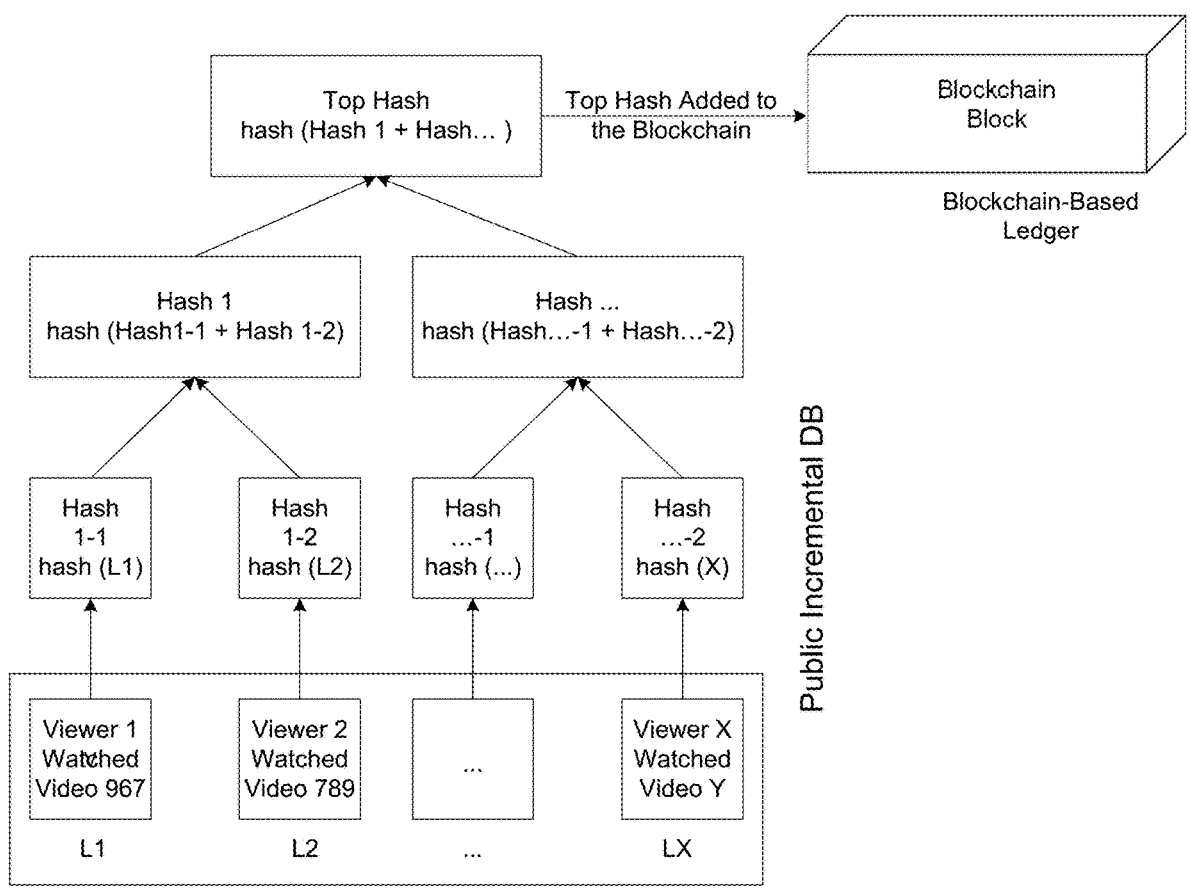
FIG. 3 is an illustration of an exemplary hashing of a chunked database utilized in conjunction with the PoV blockchain, in accordance with an embodiment of the present invention.

In an exemplary embodiment of the present invention, the system utilizes a database that is split into chunks. In this exemplary embodiment, a new chunk may be created each time a new block is created in the PoV Blockchain. A top hash of a current chunk is added to each new block in the PoV Blockchain. An exemplary embodiment is illustrated for example in FIG. 3. In alternative embodiments, the entire database may be a single file or the entire database may be stored in the blockchain. In still further embodiments, the database may be published to the PoV blockchain less often than each time a block is created. One of ordinary skill in the art would appreciate that there are numerous ways to format and record the database on the blockchain, and embodiments of the present invention are contemplated for use with any appropriate formats and recordation methods.

In at least some exemplary embodiments of the present invention, the entire database may be stored in the blockchain. Each view log entry may be stored as a separate transaction or data entry in the blockchain. The view log entry transaction may also serve as a view reward transfer transaction. The view log entry may be published to the blockchain by the viewer and/or by the system so that, for example, neither party can censor the log entry. Also for example, the entire PoV chunk may be stored in the blockchain as a single transaction or data entry. In still further embodiments, the database may be published to the PoV blockchain less often than each time a block is created. Any suitable technique may be used to format and record the database on the blockchain. The exemplary embodiments disclosed herein may be used with any appropriate formats and/or recordation methods.

In at least some exemplary embodiments of the present invention, the system may be configured to use advanced methods to ensure only views verified by the PoV methodology are counted. In accordance with these embodiments, views that are considered to be verified will be added to a publicly accessible database containing anonymized data regarding the views. In alternative embodiments, the system may be configured with open-source tools to ensure the transparency and accountability of the system. With these tools, users and third parties are able to review the data to ensure its accuracy and credibility. Although the view data may be anonymous, individual users can generate their own unique ID to verify that the views recorded for their ID are accurate and not manipulated. In accordance with these embodiments, to ensure that the data stored within the publicly accessible PoV database is reflective of the true actual data, some or substantially all view data may be sent both to the verifying system as well as to the servers hosting the content. This allows the system to automatically check that the data on the servers' view database is accurate and has not been altered. In some embodiments of the present invention, the system further comprises an application that automatically checks that the views on the blockchain are verified and matches the views on the public database. If there is any corruption or change to the data detected, an alert notice may be automatically provided by the system. In this manner, the system prevents multiple methods that users may attempt to manipulate view counts and audience metrics such as: (i) automated repeated viewing of videos (looping views); (ii) attempting to load multiple videos in parallel; (iii) loading videos in hidden windows/tabs; and (iv) attempting to manipulate analytics without actually watching the videos. Alternatively in at least some exemplary embodiments, the exemplary disclosed PoV database may be stored using computing devices for example as described herein regarding FIGS. 1 and 2. For example, the computing devices as described herein regarding FIGS. 1 and 2 may allow or block (e.g., not allow) free access to the exemplary disclosed PoV database and proof of view data.

In at least some exemplary embodiments of the present invention, the system provides an internal market exchange for stakes in content channels. This system thereby enables content creators/publishers to finance additional growth and development of their content via offering stakes in their channels and future content offerings. According to an embodiment of the present invention, creators/publishers can sell a part in their channel to stakeholders at a price set by Creators/publishers. The sale may be conducted in a cryptocurrency, fractional ownership offering, or other currency or similar offering. In at least some exemplary embodiments, participation in the channel may provide the same % share of future earnings back to stakeholders in the channel based on their ownership in the channel. In certain instances, stakeholders in a channel can resell their stake through the Content Market Exchange based on the current market value of the stake. Much like in other marketplaces (e.g., securities markets), limitations or restrictions may be placed on the transfer, based on one or more preset rules. One of ordinary skill in the art would appreciate that there are numerous rules and restrictions that may be utilized, and embodiments of the present invention are contemplated for use with any appropriate rules or restrictions.

According to an embodiment of the present invention, current market value of a stake in a channel is calculated by the system. In at least some exemplary embodiments of the present invention, the system calculates the value of a stake in the channel by taking into account one or more data points, selected from the group comprising, but not limited to, verified views (PoV) of the content, the revenue stream of the channel, the recommendation engine and other key parameters. One of ordinary skill in the art would understand that there are numerous key parameters and other data points that could be utilized in calculating the value of a stake in a channel, and the overall channel value, and embodiments of the present invention are contemplated for use with any such data points and key parameters. In effect the exchange presented by the system will work much like online spot exchanges where buyers can bid/offer and set limits for purchasing or selling stakes that are available on the exchange index.

Figure 1:
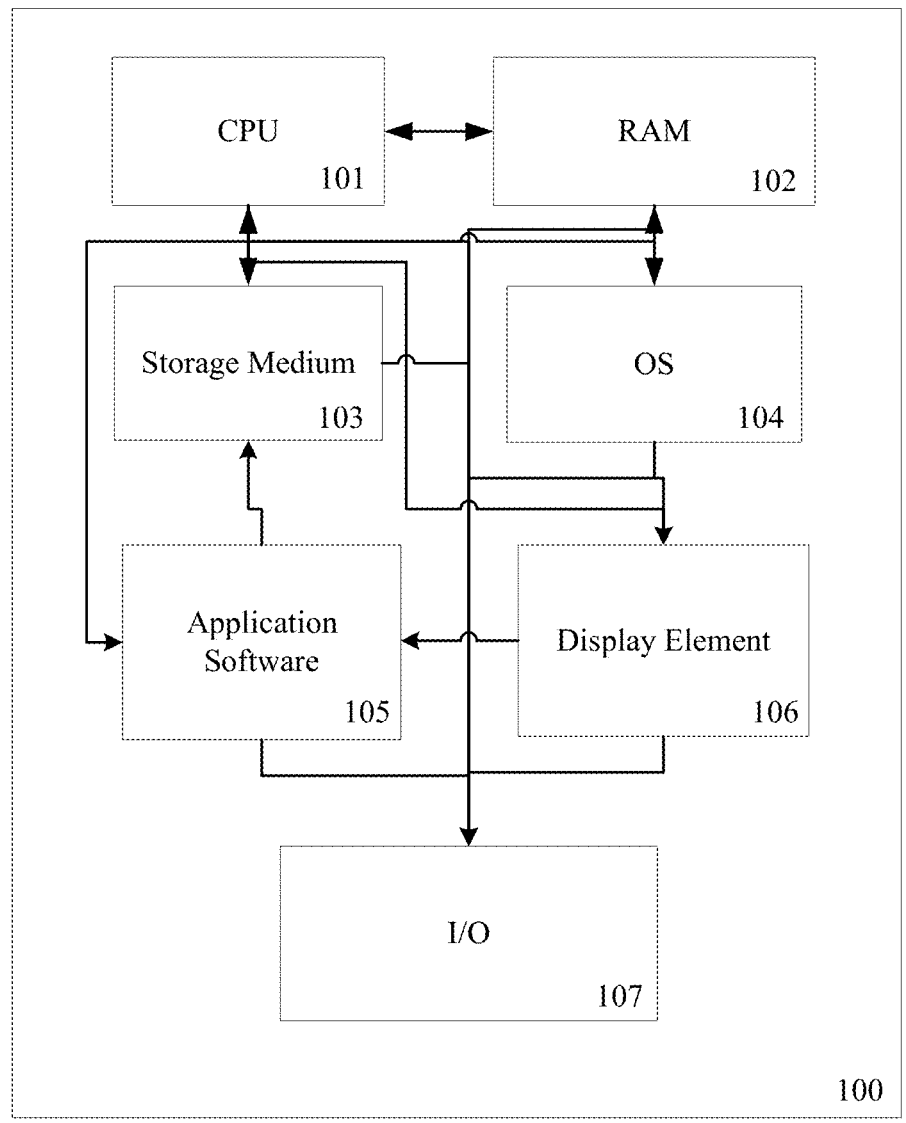
FIG. 1 is a schematic illustration of an exemplary computing device, in accordance with at least some exemplary embodiments of the present invention.

Turning now to FIG. 1, an illustrative representation of a computing device appropriate for use with embodiments of the system of the present disclosure is shown. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element (e.g., monitor, capacitive touchscreen) 106, and one or more input/output devices/means 107, including one or more communication interfaces (e.g., RS232, Ethernet, Wifi, Bluetooth, USB). Useful examples include, but are not limited to, personal computers, servers, tablet PCs, smartphones, or other computing devices. In preferred embodiments of the present invention, multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 2, which is discussed herein-below.

According to an exemplary embodiment of the present disclosure, data may be transferred to the system, stored by the system and/or transferred by the system to users of the system across local area networks (LANs) or wide area networks (WANs). In accordance with the previous embodiment, the system may be comprised of numerous servers, mining hardware, computing devices, or any combination thereof, communicatively connected across one or more LANs and/or WANs. One of ordinary skill in the art would appreciate that there are numerous manners in which the system could be configured and embodiments of the present disclosure are contemplated for use with any configuration.

Figure 2:
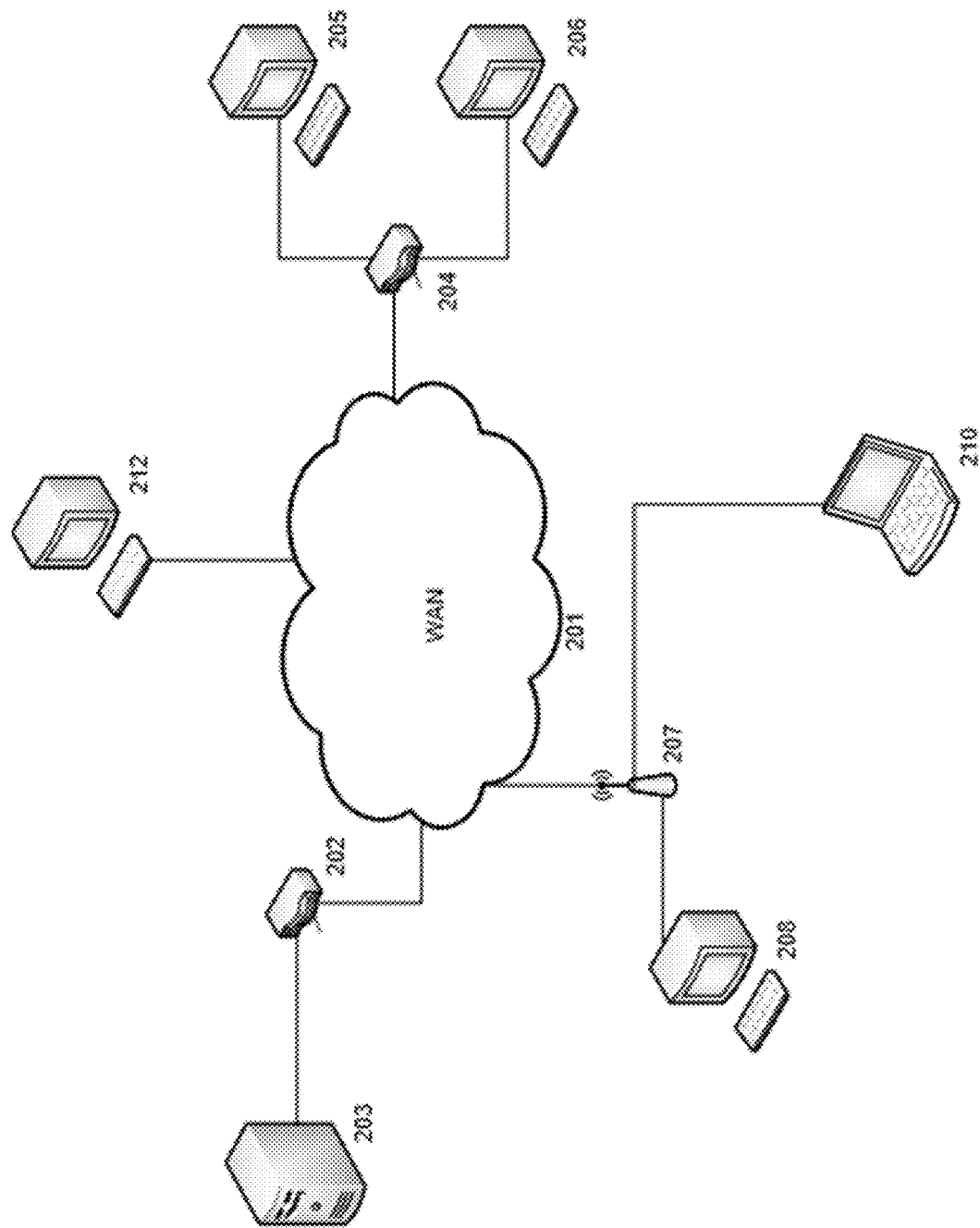
FIG. 2 is a schematic illustration of an exemplary network, in accordance with at least some exemplary embodiments of the present invention.

Referring to FIG. 2, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, or iii) through a computing device 208, 210 connected to a wireless access point 207. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any circuitry or other means for communicating data over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

The exemplary disclosed system and method may be used in any suitable application for providing a Proof of View (PoV) of online content. For example, the exemplary disclosed system and method may be used in any suitable application for ensuring that content such as internet content available on the internet has actually been viewed by a user such as a consumer. The exemplary disclosed system and method may for example be used in any application in which providing PoV (e.g., verifying that a user actually viewed content) affects a valuation or compensation (e.g., based on advertising revenue tied to a number of users viewing content) for a given website or platform.

Figure 4:
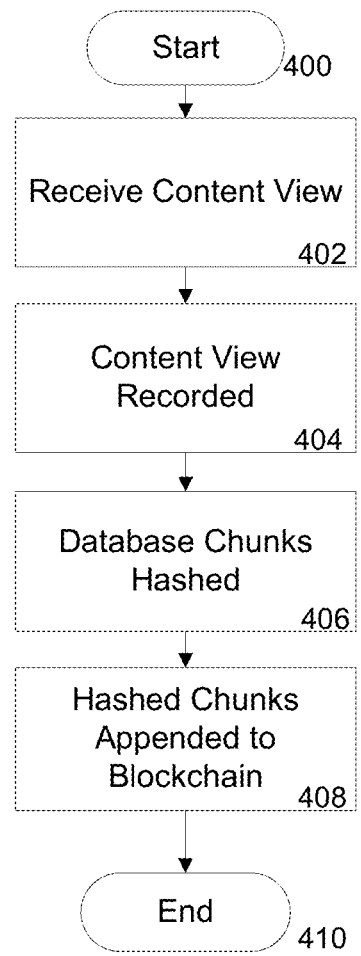
FIG. 4 is an illustration of an exemplary method for providing proof of view via blockchain, in accordance with an embodiment of the present invention.

Turning now to FIG. 4, an exemplary method for providing proof of view via blockchain, in accordance with an embodiment of the present invention, is shown. The process starts at 400 with the system being engaged to provide PoV for one or more pieces of online content. At step 402, the system receives a content view event, generally via a user requesting to view a piece of content. Content may be any form of textual, graphical, multimedia, or other audio/visual or other digital or analog work. One of ordinary skill in the art would appreciate that there are numerous types of content that could be used with embodiments of the present invention, and embodiments of the present invention are contemplated for use with any appropriate type of content. The exemplary disclosed content view may include content viewed using any desired web browser (e.g., Google Chrome, Apple Safari, Microsoft Internet Explorer, Mozilla Firefox, Opera, or any other suitable web browser). The exemplary disclosed content view may also include content viewed using any suitable application programming interface (API) or app such as mobile device apps, web apps, hybrid apps, or any other suitable type of app. The exemplary disclosed content view may further include content viewed on any suitable device such as, for example, smart tv or any other suitable type of streaming device.

At step 404, the content view is recorded by the system and those associated with the system in that the system comprises those mining and recording transactions (e.g., views) on the system's associated blockchain. The view record may be digitally signed by the viewer and/or by the system. In an exemplary embodiment of the present invention, chunks of a database in which the views may be recorded are then hashed (step 406). Any suitable digital signature scheme may be used with exemplary embodiments of the present invention, and exemplary embodiments of the present invention may be used with any appropriate type of digital signature.

At step 408, at the next entrance of a block on the blockchain, each of the hashed database chunks will be appended to a block on the blockchain ledger. At this point, each of the recorded views can be verified at any time as the PoV blockchain is available for review. Since the data is stored in a decentralized manner, any third party is able to prove that each top hash added to the PoV blockchain is accurate and unchanged. This allows any third party to verify that the logs added within each new block on the blockchain have not been tampered with, changed, branched or forked. At this point, the process terminates at step 410.

Figure 5:
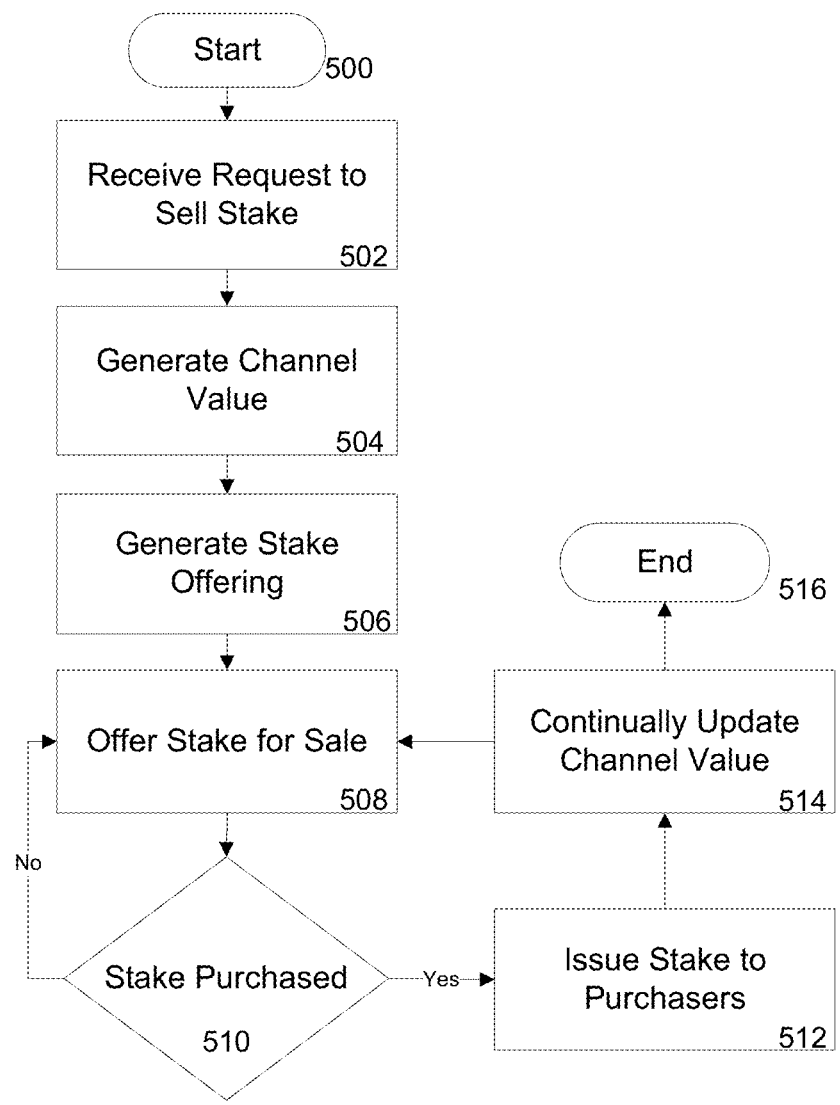
FIG. 5 is an illustration of an exemplary method for providing a channel stake marketplace, leveraging proof of view via blockchain, in accordance with an embodiment of the present invention.

Turning now to FIG. 5, an illustration of an exemplary method for providing a channel stake marketplace, leveraging proof of view via blockchain in accordance with an embodiment of the present invention, is shown. The process starts at step 500 with a user implementing a request to sell stake in a channel. The system receives the request to sell a stake at step 502, and parses the information in the request for use in the generation of a stake offering. Information associated with the request may include, but is not limited to, size of the stake offered (e.g., total $ in currency, cryptocurrency, or other compensation desired from sale, or maximum % of channel to offer).

At step 504, the system generates a value of the channel involved in the stake offering. In at least some exemplary embodiments, the value of the channel may be based on the number of verified content views retrieved from the PoV blockchain associated with the system or the channel. Other data points may also be used to generate this value, including, but not limited to, growth rate of a channel, number of subscribers to a channel, history of channel and stake offerings, or any combination thereof. One of ordinary skill in the art would appreciate that there are numerous data points that could be utilized with embodiments of the present invention for determining the value of a channel, and embodiments of the present invention are contemplated for use with any appropriate data points.

At step 506, the system generates the stake offering, based at least in part on the channel value and/or the information associated with the request. Once generated, the system offers the generated stake offering for sale to users (step 508). The stake offering may be purchased at step 510.

If the stake is not purchased, the system may re-offer the stake for sale. In certain embodiments, before reoffering the stake for sale, the stake offering may be recalculated on one or more points, for instance, by recalculating a sale price of each share in the channel, or by re-assessing the channel value.

If the stake offering is successful and subscribed to, then the system will issue the relevant stakes to those who invested or otherwise purchased a stake in the channel (step 512). Rights and revenues may then be conveyed to the purchasing users as provided for in the stake offering.

At step 514, with the stakes issued to the various purchasers, the system continues to monitor and update the channel value. As long as permissible under the rules of the stake offering, the users that purchased into the stake may offer their portion of the stake for sale to others. Generally, this offering will be at the current value priced by the system. However, in other embodiments, the system may allow for more complex trading means (e.g., offers, options). At this point, the process terminates at step 516.

In at least some exemplary embodiments, the exemplary Proof of View verification system may include a Proof of View verification module, comprising computer-executable code stored in non-volatile memory, and a processor. The Proof of View verification module and the processor may be configured to receive a request for a content view to view a piece of content, record a content view data in a database chunk, hash the database chunk into a hashed database chunk, append the hashed database chunk to a block on a blockchain of the Proof of View verification system, and compare the content view data with the block on the blockchain. The blockchain may be publicly available. The blockchain may be available for review by any third party. Each top hash added to the blockchain may be auditable by any third party. Each new block added to the blockchain may be auditable by any third party. The piece of content may be textual data, graphical data, multimedia data, audio data, and/or visual data. The content view may be an internet webpage view. The Proof of View verification system may include a plurality of parties engaged in mining and recording transactions on the blockchain. The Proof of View verification module and the processor may be configured to provide a unique ID to a user, the unique ID being associated with data on the blockchain corresponding to that user's content view data. The user may use the unique ID to ensure (e.g., compare that the data on the blockchain corresponding to that user's content view data is accurate. The Proof of View verification system may automatically compare the content view data with the block on the blockchain. The Proof of View verification system may automatically provide an alert notice when the content view data does not match the block. The Proof of View verification system may be detached (e.g., substantially completely detached) from any entities or parties. For example, the Proof of View verification system may be a decentralized finance system that may operate without central financial entities. The Proof of View verification system may utilize smart contracts on blockchain similarly to for example the exemplary disclosed blockchains described herein. For example, the Proof of View verification system may utilize decentralized applications that use blockchain such as described herein to perform financial functions. In at least some exemplary embodiments, the Proof of View verification system may utilize smart contracts on blockchains to capture, verify, and validate (e.g., and enforce) agreed-upon contractual terms between multiple parties. The Proof of View verification system may thereby provide agreements and transactions to be performed among entities (e.g., anonymous entities) without use of a central entity or external legal enforcement. For example, the Proof of View verification system may allow for data of a smart contract to be encrypted and to exist on the blockchain (e.g., the data recorded in the blockchain may not be modified, lost, or deleted).

In at least some exemplary embodiments, the exemplary method may include receiving a request to sell a stake of a channel of the channel stake marketplace, determining a value of the channel, generating a stake offering based on the value of the channel, and updating the value of the channel. Determining the value of the channel may include determining the amount of verified content views of the channel. Determining the amount of verified content views of the channel may include recording a content view data in a database chunk, hashing the database chunk into a hashed database chunk, appending the hashed database chunk to a block on a blockchain, and comparing the content view data with the block on the blockchain. The value of the channel may be based on the number of verified content views retrieved from the blockchain. The exemplary method may also include issuing the stake of the channel to a user who purchased the stake of the channel based on the stake offering. The value of the channel may be based on data points such as, for example, growth rate of the channel, number of subscribers to the channel, history of the channel, and/or history of stake offerings. Updating the value of the channel may include determining an updated amount of verified content views of the channel.

In at least some exemplary embodiments, the method may include receiving a request for a content view to view a piece of content, recording a content view data in a database chunk, hashing the database chunk into a hashed database chunk, appending the hashed database chunk to a block on a blockchain, and comparing the content view data with the block on the blockchain. Each new block added to the blockchain may be auditable by any third party. The content view may be an internet webpage view. The exemplary method may further include providing a unique ID to a user, the unique ID being associated with data on the blockchain corresponding to that user's content view data. The user may use the unique ID to ensure (e.g., compare) that the data on the blockchain corresponding to that user's content view data is accurate.

In at least some exemplary embodiments, the exemplary disclosed Proof of View verification system may include a Proof of View verification module, comprising computer-executable code stored in non-volatile memory, a processor, and a plurality of computing devices. The Proof of View verification module, the processor, and the plurality of computing devices may be configured to receive a request to sell a stake of a channel, determine a value of the channel, generate a stake offering based on the value of the channel, and update the value of the channel. Determining the value of the channel may include determining the amount of verified content views of the channel. Determining the amount of verified content views may include transferring data of a piece of content between the plurality of computing devices. Determining the amount of verified content views of the channel may include providing a unique ID data for a user, recording a content view data, which corresponds to the transferred data of the piece of content, in a database chunk, hashing the database chunk into a hashed database chunk, appending the hashed database chunk to a block on a blockchain, and comparing the content view data with the block on the blockchain by determining whether or not the unique ID data is included in both the content view data and the block. The blockchain may be publicly available and accessible via a third party computing device. The Proof of View verification module, the processor, and the plurality of computing devices may also be configured to issue the stake of the channel to a user who purchased the stake of the channel based on the stake offering, and utilize smart contracts on the blockchain. The blockchain may be available for review by any third party. Each top hash added to the blockchain may be auditable by any third party. Each new block added to the blockchain may be auditable by any third party. The data of the piece of content may be selected from the group consisting of textual data, graphical data, multimedia data, audio data, and visual data. The verified content views may be selected from the group of internet webpage views, app views, streaming device views including smart tv views, and combinations thereof. Transferring the data of the piece of content between the plurality of computing devices may include streaming video data between the plurality of computing devices via a local area network or a wide area network. The Proof of View verification system may include a plurality of parties engaged in mining and recording transactions on the blockchain. The Proof of View verification module, the processor, and the plurality of computing devices may be configured to compare the content view data with the unique ID data to ensure that the data on the blockchain corresponding to the user's content view data is accurate. The Proof of View verification system may automatically compare the content view data with the block on the blockchain. The Proof of View verification system may provide an alert notice when the content view data does not include the unique ID data.

In at least some exemplary embodiments, the exemplary disclosed method may include receiving a request to sell a stake of a channel, determining a value of the channel, generating a stake offering based on the value of the channel, and updating the value of the channel. Determining the value of the channel may include determining the amount of verified content views of the channel. Determining the amount of verified content views may include transferring data of a piece of content between a plurality of computing devices. Determining the amount of verified content views of the channel may include providing a unique ID data for a user, recording a content view data, which corresponds to the transferred data of the piece of content, in a database chunk, hashing the database chunk into a hashed database chunk, appending the hashed database chunk to a block on a blockchain, and comparing the content view data with the block on the blockchain by determining whether or not the unique ID data is included in both the content view data and the block. The blockchain may be publicly available and accessible via a third party computing device. The exemplary disclosed method may also include issuing the stake of the channel to a user who purchased the stake of the channel based on the stake offering, and utilizing smart contracts on the blockchain. The value of the channel may be based on the number of verified content views retrieved from the blockchain. The value of the channel may be based on data points selected from the group consisting of growth rate of the channel, number of subscribers to the channel, history of the channel, and history of stake offerings. Updating the value of the channel may include determining an updated amount of verified content views of the channel.

In at least some exemplary embodiments, the exemplary disclosed method may include receiving a request to sell a stake of a channel, determining a value of the channel, generating a stake offering based on the value of the channel, and updating the value of the channel. Determining the value of the channel may include determining the amount of verified content views of the channel. Determining the amount of verified content views may include transferring data of a piece of content between a plurality of computing devices. Determining the amount of verified content views of the channel may include providing a unique ID data for a user, recording a content view data, which corresponds to the transferred data of the piece of content, in a database chunk, hashing the database chunk into a hashed database chunk, appending the hashed database chunk to a block on a blockchain, and comparing the content view data with the block on the blockchain by determining whether or not the unique ID data is included in both the content view data and the block. The exemplary disclosed method may also include issuing the stake of the channel to a user who purchased the stake of the channel based on the stake offering. The blockchain may be publicly available and accessible via a third party computing device. The content view data may be stored on a computing device that blocks public access to the content view data. The value of the channel may be based on the number of verified content views retrieved from the blockchain. The value of the channel may be based on data points selected from the group consisting of growth rate of the channel, number of subscribers to the channel, history of the channel, and history of stake offerings.

The exemplary disclosed system and method may provide an efficient technique for verifying views of content such as internet content that may be viewed by internet users. For example, the exemplary disclosed system and method may provide a transparent technique for users to utilize a public ledger to verify that online content has actually been viewed. The exemplary disclosed system and method may thereby provide an effective technique for determining the value of a content provider's channel (e.g., for the purposes of compensation based on advertising or other criteria dependent on how much given content is viewed by users such as consumers). For example, the exemplary disclosed system and method may verify whether an intended targeted audience has actually viewed content of a given provider (e.g., as well as advertisements that may be co-located with the content).

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

While multiple embodiments are disclosed, still other embodiments of the present disclosure will become apparent to those skilled in the art from this detailed description. There may be aspects of this disclosure that may be practiced without the implementation of some features as they are described. It should be understood that some details have not been described in detail in order to not unnecessarily obscure the focus of the disclosure. The disclosure is capable of myriad modifications in various obvious aspects, all without departing from the spirit and scope of the present disclosure. Accordingly, the drawings and descriptions are to be regarded as illustrative rather than restrictive in nature.

What is claimed is:
1. A Proof of View verification system, comprising:
a Proof of View verification module, comprising computer-executable code stored in non-volatile memory;
a processor; and
a plurality of computing devices;
wherein the Proof of View verification module, the processor, and the plurality of computing devices are configured to:
  receive a request to sell a stake of a channel;
  determine a value of the channel;
  generate a stake offering based on the value of the channel;
  update the value of the channel;
  wherein determining the value of the channel includes determining the amount of verified content views of the channel;
  wherein determining the amount of verified content views includes transferring data of a piece of content between the plurality of computing devices;
  wherein determining the amount of verified content views of the channel includes providing a unique ID data for a user, recording a content view data, which corresponds to the transferred data of the piece of content, in a database chunk, hashing the database chunk into a hashed database chunk, appending the hashed database chunk to a block on a blockchain, and comparing the content view data with the block on the blockchain by determining whether or not the unique ID data is included in both the content view data and the block; and wherein the blockchain is publicly available and accessible via a third party computing device;

issue the stake of the channel to a user who purchased the stake of the channel based on the stake offering; and utilize smart contracts on the blockchain.

2. The Proof of View verification system of claim 1, wherein the blockchain is available for review by any third party.

3. The Proof of View verification system of claim 2, wherein each top hash added to the blockchain is auditable by any third party.

4. The Proof of View verification system of claim 2, wherein each new block added to the blockchain is auditable by any third party.

5. The Proof of View verification system of claim 1, wherein the data of the piece of content is selected from the group consisting of textual data, graphical data, multimedia data, audio data, and visual data.

6. The Proof of View verification system of claim 1, wherein the verified content views are selected from the group of internet webpage views, app views, streaming device views including smart tv views, and combinations thereof.

7. The Proof of View verification system of claim 1, wherein transferring the data of the piece of content between the plurality of computing devices includes streaming video data between the plurality of computing devices via a local area network or a wide area network.

8. The Proof of View verification system of claim 1, wherein the Proof of View verification system includes a plurality of parties engaged in mining and recording transactions on the blockchain.

9. The Proof of View verification system of claim 1, wherein the Proof of View verification module, the processor, and the plurality of computing devices are configured to compare the content view data with the unique ID data to ensure that the data on the blockchain corresponding to the user's content view data is accurate.

10. The Proof of View verification system of claim 1, wherein the Proof of View verification system automatically compares the content view data with the block on the blockchain.

11. The Proof of View verification system of claim 9, wherein the Proof of View verification system provides an alert notice when the content view data does not include the unique ID data.

12. A method, comprising:
receiving a request to sell a stake of a channel;
determining a value of the channel;
generating a stake offering based on the value of the channel;
updating the value of the channel;
wherein determining the value of the channel includes determining the amount of verified content views of the channel;
wherein determining the amount of verified content views includes transferring data of a piece of content between a plurality of computing devices;
wherein determining the amount of verified content views of the channel includes providing a unique ID data for a user, recording a content view data, which corresponds to the transferred data of the piece of content, in a database chunk, hashing the database chunk into a hashed database chunk, appending the hashed database chunk to a block on a blockchain, and comparing the content view data with the block on the blockchain by determining whether or not the unique ID data is included in both the content view data and the block; and wherein the blockchain is publicly available and accessible via a third party computing device;

issuing the stake of the channel to a user who purchased the stake of the channel based on the stake offering; and utilizing smart contracts on the blockchain.

13. The method of claim 12, wherein the value of the channel is based on the number of verified content views retrieved from the blockchain.

14. The method of claim 12, wherein the value of the channel is based on data points selected from the group consisting of growth rate of the channel, number of subscribers to the channel, history of the channel, and history of stake offerings.

15. The method of claim 12, wherein updating the value of the channel includes determining an updated amount of verified content views of the channel.

16. A method, comprising:
receiving a request to sell a stake of a channel;
determining a value of the channel;
generating a stake offering based on the value of the channel;
updating the value of the channel;
wherein determining the value of the channel includes determining the amount of verified content views of the channel;
wherein determining the amount of verified content views includes transferring data of a piece of content between a plurality of computing devices; and
wherein determining the amount of verified content views of the channel includes providing a unique ID data for a user, recording a content view data, which corresponds to the transferred data of the piece of content, in a database chunk, hashing the database chunk into a hashed database chunk, appending the hashed database chunk to a block on a blockchain, and comparing the content view data with the block on the blockchain by determining whether or not the unique ID data is included in both the content view data and the block; and issuing the stake of the channel to a user who purchased the stake of the channel based on the stake offering.

17. The method of claim 16, wherein the blockchain is publicly available and accessible via a third party computing device.

18. The method of claim 16, wherein the content view data is stored on a computing device that blocks public access to the content view data.

19. The method of claim 16, wherein the value of the channel is based on the number of verified content views retrieved from the blockchain.

20. The method of claim 16, wherein the value of the channel is based on data points selected from the group consisting of growth rate of the channel, number of subscribers to the channel, history of the channel, and history of stake offerings.

* * * * *